United States Patent [19]

Sakurada et al.

[11] 3,931,088

[45] Jan. 6, 1976

[54] ADHESIVE COMPOSITION CONSISTING OF POLYVINYLALCOHOL SOLUTION OR POLYVINYLACETATE LATEX MODIFIED WITH HYDROPHOBIC SOLUTION OF ISOCYANATE COMPOUND

[75] Inventors: Seiichi Sakurada, Shimizu; Yasuaki Miyazaki, Hino; Tatsuaki Hattori; Makoto Shiraishi, both of Toyama; Taisei Inoue, Mitaka, all of Japan

[73] Assignees: Kuraray Co., Ltd., Kurashiki; Asahi Co., Ltd.; Koyo Sangyo Co., Ltd., both of Tokyo, all of Japan

[22] Filed: Aug. 1, 1973

[21] Appl. No.: 384,542

[30] Foreign Application Priority Data

Aug. 5, 1972 Japan.............................. 47-78587

[52] U.S. Cl....260/29.6 RB; 260/29.6 N; 260/29.6 B; 260/29.6 WA; 260/91.3 VA
[51] Int. Cl.².................... C08L 29/04; C08L 23/36
[58] Field of Search... 260/29.6 B, 29.6 N, 29.6 RB, 260/91.3 VA; 117/DIG. 7

[56] References Cited
UNITED STATES PATENTS

| | | | |
|---|---|---|---|
| 2,277,083 | 3/1942 | Dorough | 260/17 R |
| 2,430,479 | 7/1941 | Pratt et al. | 117/DIG. 7 |
| 3,350,362 | 10/1967 | Potts et al. | 117/DIG. 7 |
| 3,382,215 | 5/1968 | Baum | 117/DIG. 7 |
| 3,791,849 | 2/1974 | Hammer et al. | 117/DIG. 7 |

*Primary Examiner*—Joseph L. Schofer
*Assistant Examiner*—Peter F. Kulkosky
*Attorney, Agent, or Firm*—Kaufman & Kramer

[57] ABSTRACT

An adhesive composition is provided comprising (1) a member selected from the group consisting of an aqueous solution of polyvinylalcohol, an aqueous emulsion of vinyl acetate polymer and an aqueous latex of butadiene polymer and (2) a hydrophobic solution of an isocyanate compound or polymer.

8 Claims, No Drawings

ADHESIVE COMPOSITION CONSISTING OF POLYVINYLALCOHOL SOLUTION OR POLYVINYLACETATE LATEX MODIFIED WITH HYDROPHOBIC SOLUTION OF ISOCYANATE COMPOUND

The invention relates to a water-resistant adhesive, which is especially useful for bonding of wood.

At present, urea resins, melamine-urea co-condensation resins and phenol resins are predominately used as the adhesives for making plywood. These adhesives are widely used because of their low price and relatively good water-reistance; however, it has recently been found that evaporation of residual formaldehyde (hereafter called "formalin") from the adhesive adversely effects the environment within the plywood factory and release of formalin from furniture or housing made therefrom has been found injurious to the human body.

Although several attempts have been made recently to decrease the generation of formalin, they have all been largely unsuccessful since it is impossible, in principle, to reduce the generation of formalin to essentially zero. Moreover, the fluctuations in hot pressing conditions during the process for producing plywood, can result in incomplete curing of the adhesive, giving rise to the subsequent generation of formalin. Therefore, the use of condensation resins containing formalin in the preparation of plywood has been severely restricted.

Furthermore, other adhesives which do not contain formalin, such as protein or polyvinyl acetate based adhesives, are not useful, generally, due to their poor water resistance.

Furthermore, another adhesive which has heretofore been employed in plywood production and which does not contain formalin is a polyvinyl alcohol (hereafter PVA)-isocyanate system as described in U.S. Pat. No. 2,277,083.

In said United States Patent, PVA and an isocyanate are used in combination in a non-aqueous medium. For example, the procedure as set forth in Example 2 of said patent is as follows: After coating an aqueous solution of PVA on a single board and drying, a solution of hexamethylene-diisocyanate in toluene is coated over the PVA layer. By laminating several ply in this manner, plywood is manufactured. It is apparent that, in this manner, it is generally impossible to manufacture plywood with sufficient adhesive strength, as shown by the comparative example below.

Furthermore, though it is a well known fact that related isocyanate compounds react easily with compounds having an active hydrogen, isocyanates were not heretofore employed as a waterproofing component of an adhesive in an aqueous medium, for the reason that, not only do they decompose easily when mixed with water, generating carbon dioxide gas and resulting in a substantially unworkable system, but also no good effects are expected from the standpoint of stability and waterproofing.

The present invention has overcome these difficulties and defects. In accordance with the present invention, a water-resistant adhesive is prepared by uniformly dispersing a solution of a compound or polymer of an isocyanate in a solvent therefor, said solvent being scarcely water soluble, (hereafter said solvent is written as "solvent"), into an aqueous solution of PVA and/or an aqueous emulsion of vinyl acetate polymer and/or an aqueous latex of butadiene polymer.

The adhesive of the present invention exhibits superior water-resistance and an excellent initial adhesive strength.

In accordance with the present invention, it becomes possible to obtain such a water-resistant adhesive by uniformly dispersing the solution of isocyanate compound or polymer in said "solvent" in the aqueous solution of PVA and/or an aqueous emulsion of vinyl acetate polymer or latex of butadiene polymer. If said isocyanate compound or polymer without solvent or dissolved in a solvent other than the said "solvent" as defined herein, is dispersed in the PVA, vinyl acetate or butadiene polymer solutions, emulsions or latices, it is impossible to get such a water-resistant adhesive.

Furthermore, in the present invention, the presence of water is important. If a solvent other than water is employed for the vinyl alcohol, vinyl acetate or butadiene polymer solutions, emulsions or latices, it is impossible to get such a superior water-resistant adhesive.

In the present invention, the aqueous emulsion of a vinyl acetate polymer can be, for example, an aqueous emulsion of polyvinyl acetate, an aqueous emulsion of a copolymer of vinyl acetate and a comonomer polymerizable therewith (e.g., a copolymer of vinyl acetate and ethylene).

Further, the aqueous latex of butadiene polymer can be, for example, an aqueous latex of a copolymer of butadiene and styrene (SBR), an aqueous latex of a copolymer of butadiene and acrylonitrile or an aqueous latex of a copolymer of butadiene and another comonomer polymerizable therewith.

SBR latices which can be used in this invention include commercially available SBR and modified SBR products. Use of modified SBR obtained by copolymerizing or adding a carboxyl group or carboxylic acid salt to SBR, adding a hydroxyl group to SBR latex and other modified SBR formed by adding at least one functional group selected from amide, amino, sulfonic and epoxy groups and their salts is especially preferred. By the term "latex added with a carboxyl group or carboxylic acid salt" is meant a latex in which a carboxylic group or carboxylic acid salt is contained in at least one of the latex-constituting polymer or surfactant. As the carboxylic group-containing unsaturated monomer, there may be mentioned copolymerizable unsaturated organic acids such as acrylic acid, methacrylic acid, crotonic acid, itaconic acid, partially esterified itaconic acid, maleic acid, maleic anhydride, partially esterified maleic acid and the like. SBR in which a carboxylic acid salt (for instance, sodium, potassium, calcium and ammonium salts) is formed by adding a basic substance to a carboxyl group-containing SBR can also be employed. The SBR need not necessarily contain a carboxyl group or its salt therein, but a carboxyl group or its salt may be contained in a surfactant or stabilizer to be used in the polymerization process. As such surfactant, there may be mentioned saponified products of fatty acids, namely various soaps.

By the "hydroxyl group added latex" is meant a latex in which a hydroxyl group is contained in at least one of the latex-constituting polymer or surfactant. As the hydroxyl group-containing unsaturated monomer, there can be mentioned copolymerizable monomers such as allyl alcohol, 2-hydroxylethyl (meth) acrylate, 2-hydroxypropyl (meth)acrylate, mono-allyl ethers of polyhydric alcohols, and N-methylol (meth)acrylamide. Hydroxyl group-containing polymer latices prepared by methods other than that mentioned above may be used. For instance, a polymer latex formed by adding a small amount of a basic substance to a copolymer containing vinyl acetate as one component and partially saponifying vinyl acetate to thereby introduce a hydroxyl group into the copolymer can be used. The hydroxyl group need not necessarily be contained in the latex-constituting polymer, but it may be contained in a surfactant or stabilizer to be used in the polymerization process. As such surfactant, there may be mentioned, for instance, polyoxyethylene alkyl ethers, polyoxyethylene alkylphenol ethers, oxyethylene-oxypropylene block copolymers and the like.

By the term "the latex added with at least one functional group selected from amino, amide, sulfonic and epoxy groups and their salts" is meant a latex in which such functional group is contained in at least one of the latex-constituting polymer or surfactant. As the unsaturated monomer containing such a functional group as amino, amide, sulfonic and epoxy groups, there may be mentioned copolymerizable monomers such, for example, as glycidyl (meth)acrylate, allyl glycidyl ether, dimethyl-aminoethyl methacrylate, vinylpyridine, t-butylaminoethyl (meth)acrylate, acrylamide, methacrylamide and maleinamide. Latices containing a salt (for example, amine hydrochloride) formed by adding a basic substance or acidic substance to the foregoing functional group-containing polymer latices can also be employed. Such functional group need not necessarily be contained in the latex-constituting polymer, but it may be contained in a surfactant or stabilizer to be used in the polymerization step. As such surfactant, there may be exemplified polyacrylamide, alkylamine sulfates, sodium monobutylphenylphenol sulfate, sodium monobutyldiphenyl sulphate, sodium dibutylphenyl sulfate, sodium monobutyldiphenyl sulfate, sodium dibutylphenylphenol sulfate, sodium alkylallyl sulfonate, sodium dodecylbenzenesulfonate, sodium paraffin sulfate, sodium lauryl alcohol sulfate, sodium secondary alcohol (having 14 carbon atoms) sulfate, sodium octyl alcohol sulfate and the like. Namely, these surfactants contain in the molecule an amide group, a sodium sulfonate, an amine salt or the like.

Among the foregoing modified SBR latices, a carboxyl group- or carboxylic acid salt-copolymerized or added latex is especially preferred. The content of the carboxyl group-containing organic acid in the latex is 0.1 to 30% by weight, preferably 0.2 to 15% by weight, based on the total solids. These latices can be prepared in an aqueous system according to customary methods with use of a radical initiator, a surfactant and an adjusting agent. In addition to the above-exemplified surfactants, various anionic, non-ionic and cationic surfactants can also be used.

It is possible to add as a protective colloid a water-soluble macromolecule substance such as mentioned above before, during or after the polymerization. The so formed aqueous latex can also be employed in this invention.

The primary reason for use of SBR in this invention is that the characteristic properties of a film formed from a blend of SBR with PVA are improved to thereby increase the normal state bonding strength of bonded wood and the water resistance of the resulting bond. The secondary reason is that by employing SBR latex added with a carboxyl group or its salt, a hydroxyl group or an amino, amide, sulfonic, isocyanate or epoxy group, such functional group in the latex is allowed to react with a compound having at least two isocyanate groups which is incorporated in the adhesive composition, to thereby form a water-insoluble, cross-linked net-like structure and give a bond exhibiting excellent water resistance. The third reason is that by use of such SBR latex it is possible to increase the concentration of solids at a viscosity within such a range as will not cause any operational trouble and to obtain an adhesive composition having good coating processability and a highly improved initial bonding strength. Accordingly, use of an aqueous SBR latex is preferred in this invention.

The concentration of PVA in the aqueous solution desirably ranges from 5 to 20 weight percent. The PVA employed in the present invention can exhibit a degree of polymerization ranging from 300 to 2500 and a degree of saponification of from 80 to 100 molar percent, it is especially desirable to use a PVA having a high degree of saponification.

The aqueous PVA solution can be prepared using hot water, or, in the case of PVA soluble in cold water, it is possible to first mix it with an additive or filler and then dissolve it in water just before coating.

In this invention, it is preferable to have PVA present in the above-described aqueous emulsions or latices. The concentration of PVA in the aqueous emulsion or latex preferably ranges from 5 to 20% by weight.

In the present invention, the isocyanate compound or polymer is a molecule which has two or more isocyanate residues, such as, tolylene diisocyanate (TDI, for example Desmodur T of Bayer Incorp.), hydrogenated TDI, trimethylolpropane (TMP) - TDI adduct (Desmodur L), triphenylmethane-triisocyanate (TTI, Desmodur R), methylene-bis-diphenylisocyanate (MDI, Desmodur 44), hydrogenated MDI, hexamethylene diisocyanate (Desmodur N), xylenediisocyanate, 4,4'-dicyclohexylmethane-diisocyanate and the like.

Furthermore, a mixed system of a polyisocyanate and a polyol, for example, a mixture of polyols such as polyester or polyether with hydroxy groups and an excess of isocyanate such as the said Desmodur L, can also be employed.

Furthermore, it is possible to use a prepolymer system, such as, a prepolymer with NCO end groups, partially polymerized from a polyol and an excess of polyisocyanate, or a prepolymer with OH end groups, partially polymerized from an excess of polyol, mixing it with an excess of the above mentioned Desmodur L, just before coating.

The mixing ratio of isocyanate compound or polymer to PVA (solid content) and/or emulsion and/or latex (solid content) in an adhesive can range from 1 to 200 weight percent. For plywood, it is especially preferred to range from 10 to 150 weight percent.

In the present invention, the "solvent" which dissolves the isocyanate compound or polymer, is a liquid at room temperature, and both solubilities, that of "solvent" in water and of water in "solvent", must be below 5 weight percent at a temperature between 20° to 30°C.

As the "solvent", typical examples are, aliphatic or aromatic hydrocarbons, or mixtures thereof as the main component (such as, toluene, xylene, benzene, gasoline, kerosene, ligroin, tetralin, decalin, terpentine oil, pine oil, liquid paraffin and alkylbenzene etc.), halogenated hydrocarbons (such as, methylene chloride, chlorobenzene, chlorotoluene and bromobenzene etc.), ketones (such as, methyl isobutyl ketone, methyln-amyl ketone, methyl-n-hexyl ketone, ethyl-n-butyl ketone, di-n-propyl ketone and acetophenone etc.), ethers (such as isopropyl ether, methyl-phenyl ether, ethyl-benzyl ether and furan etc.), lower aliphatic esters (such as, acetic acid isopropyl ester, acetic acid butyl ester, and propionic acid butyl ester etc.), phthalic acid esters (such as, phthalic acid butyl ester, phthalic acid dioctyl ester and phthalic acid butyl-benxyl ester etc.), oleic acid esters, adipic acid esters, azelaic acid esters, sebacic acid esters, stearic acid esters, benzoic acid esters, abietic acid esters, oxalic acid esters and phosphoric acid esters. And oils composed mainly from higher aliphatic acid esters such as castor oil, are also available.

If the "solvent" has an active hydrogen as a carboxy-, hydroxy- or amino-group in the molecule, upon mixing with the isocyanate compound or polymer, it reacts easily, resulting in a decrease in water resistance. Dilute isocyanate solutions prepared from active hydrogen solvents are ineffective in the present invention. On the other hand, in cases wherein said "solvent" has no active hydrogen, it is possible to reduce the concentration of isocyanate compound or polymer in the solution to the lowest limit wherein the isocyanate solution can still be dispersed uniformly in water. Considering the waterproof effect and dispersion effect, it is desirable to dissolve the isocyanate compound or polymer in an amount of solvent ranging from 10 to 400 weight percent or more, and most desirably 50 to 300 weight percent.

As the boiling point of the "solvent" can vary, it is also desirable to select a solvent which matches the present process and use conditions.

For example, when the composition of the present invention is used as an adhesive for plywood, it is advisable to use nonvolatile solvents having boiling points higher than 200°C., such as dibutyl phthalate, dioctylphthalate, oleic acid methyl ester and the like, to avoid odor, since the thermal press cycle for adhesion is carried out under ambient conditions. In this case, those solvents remain in the layer of adhesive, acting as a plasticizer. If, however, it is undesirable to have "solvent" remain in the layer of adhesive, a solvent of low boiling point should be employed.

The effect of the "solvent" in the adhesive is to disperse the isocyanate uniformly in an aqueous solution, emulsion or latex containing PVA, vinyl acetate polymer or butadiene polymer and to protect the isocyanate groups from direct contact with the water molecules in an emulsion.

In order to get an adhesive as a uniform dispersion, it is better to agitate it rather strongly during the addition of the solution of isocyanate compound or polymer in the "solvent", to the aqueous solution or emulsion or latex.

It is preferable to add an anionic surfactant to an adhesive mixture comprising an aqueous solution, emulsion or latex of PVA, vinyl acetate polymer or butadiene polymer and a hydrophobic solution of isocyanate. By adding an anionic surfactant, enhancement of water resistance, lessening of change in water resistance with time, reduction of bubble-formation, stabilization of the viscosity of the adhesive solution, and furthermore, preparation of an emulsified solution are easily obtained. The useful life of the adhesive comprising an aqueous solution, latex or emulsion of PVA, vinyl acetate polymer or butadiene polymer-isocyanate compound or isocyanate polymer admixture is increased markedly with the method of the present invention.

Anionic surfactants are most suitable for the present purpose. Cationic, nonionic or amphoteric surfactants show relatively poor effectiveness as compared with an anionic surfactant. A cationic surfactant has an accelerating effect on the rate of reaction, which increases the bubble-forming tendency of the mixture resulting in poor stability of the final product. Any type of anionic surfactant can be used for the process of the present invention, irrespective of the chemical structure of the surfactant. The anionic surfactants that are employed in the practice of the present invention are, for instance, carbonic acid salts such as soaps from aliphatic acid salts, and the like; sulfuric acid ester salts such as salts of sulfuric acid ester of higher alcohols, sulfuric oils, sulfuric fatty acid esters, sulfuric olefins, and the like; sulfonic acid salts such as alkyl benzene sulfonic acid salts, alkyl naphthalene sulfonic acid salts, alkyl sulfonic acid salts, Igepon T, Aerosol OT, lignin sulfonic acid salts, and the like; phosphonic ester salts such as phosphonic acid esters of higher fatty acids, and the like.

The concentration of the surfactant can range from 1 to 10 weight percent, more preferably, from 2 to 4 weight percent based on the weight of the PVA, vinyl acetate polymer or butadiene polymer content. When used in amounts less than 1 weight percent, the effect of the surfactant is not obtained. When used in large amounts exceeding 10 weight percent, the use of the surfactant gives undesired effects such as coagulation of the emulsion. The reason why addition of anionic surfactant imparts improved stability to the admixture of the present invention is not well-understood. While not wishing to be bound by any theory or mechanism, it is currently believed that in the present process, surfactant molecules are absorbed on the surface of the emulsified particles to prevent isocyanate molecules from direct contact with water molecules. Thus, decomposition of isocyanate is retarded to impart increased stability to the emulsified solution.

Furthermore, the adhesives of the present invention can contain other additives. The effect of the additives is not only to increase the amount of adhesion, but increase the waterproof property and initial adhesive power, reacting with the other components of the adhesive, especially with the isocyanate.

Additives which can be employed for these purposes include wheat flour, starches, extracted soybean powder, blood powder and other additives such as used in urea resins. Among these additives, flour and starches are preferred, as they enhance the water resistance, reacting with isocyanate, and moreover they have such a nice character that, though they are not like an adhesive paste in a cold water, they are converted to such a state by heating during the operation for adhesion.

Furthermore, the adhesives of the present invention can contain fillers. The effect of fillers is not only to prevent excessive penetration of adhesive into the wood, but also to impart better water resistance and initial adhesive strength by reacting with the isocyanate.

Suitable fillers include organic substances such as wood powder and powder of walnut shell, etc., as well as inorganic substances, such as clay, kaolin and talc, etc.

Though the mixing ratio of additive or filler depends upon the ultimate end use, the additive or filler can be generally added in the range of 10 to 100 weight percent based on the weight of solution, latex or emulsion containing PVA, vinyl acetate polymer or butadiene polymer. The additive or filler is preferably added in an amount of 15 to 50 weight percent when the adhesive is used for plywood. These additives and fillers may be used individually or in any mixture thereof. It is most desirable to combine the additives and fillers.

Furthermore, the adhesive of the present invention can be admixed with an accelerator such as, boric acid, aluminum sulfate, alum, chrome borate and the like.

Further, the adhesive of the present invention can additionally include a water glass (an aqueous solution of sodium or potassium tetrasilicate) or the like to delay the drying of the adhesive.

Moreover, the adhesive of the present invention can also contain a formalin type thermosetting resin, e.g., urea and/or melamine-formalin resin.

Although sufficient strength of adhesion can be achieved by cold pressing of the adhesive, it is desirable to use a hot press treatment to get better water resistance and adhesion.

Although the main purpose of the adhesives of the present invention is for manufacturing of plywood or manufacturing with plywood, they are also useful for woodwork, manufacturing of particle board or corrugated cardboard and for promoting adhesion of metallic foil, paper, fiber and the like.

The following examples further define and explain the present invention. It is to be understood, however, that the invention is not limited to these examples. Unless otherwise stated, all percentages and parts are by weight.

EXAMPLES 1 – 4

Four kinds of adhesive with different kinds of "solvent" were prepared. Those solvents were dioctyl phthalate, dibutyl phthalate, toluene and methylene chloride. "Millionate MR", an isocyanate belonging to the MDI series produced by Nippon Urethane Incorp., was initially diluted with these solvents to form 50% solutions thereof. Then, each solution was added, under sufficient agitation, to a 10% aqueous solution of "PVA 117", polyvinyl alcohol with a degree of polymerization of 1,750 and 98.5 mole % degree of saponification, produced by Kuraray Co., Ltd., in the amount of 200 percent based on the solids content of PVA, and then, 200% of clay based on the solids content of PVA was added.

Employing these four adhesives, plywood was prepared from three single boards of lauan, 0.7mm, 1.4mm and 0.7mm in thickness, under the following conditions:

Amount of adhesive used: 30g/0.09183m²
Cold press: 10 kg/cm² for 20 min.
Hot press: 10 kg/cm² for 1 min. at 120°C.

The resulting adhesive strengths in tepid water are summarized in Table I:

TABLE I

| Example No. | Solvent | B.P. of solvent | Solubility of solvent in water | Solubility of water in solvent | Adhesive strength in tepid water | Wood break (%) |
|---|---|---|---|---|---|---|
| 1 | dioctyl phthalate | 340°C. | 0.02 wt.% | 1.00 wt.%,20°C. | 10.2 kg/cm² | 6 |
| 2 | dibutyl phthalate | 339°C. | 0.01 wt.%,20°C. | 0.46 wt.%,20°C. | 12.3 kg/cm² | 30 |
| 3 | toluene | 110.6°C. | 0.047 wt.%, 16°C. | 0.15 mol %,10°C. | 14.0 kg/cm² | 27 |
| 4 | methylene-dichloride | 40.4°C. | 2 wt.%,20°C. | 0.17 wt.%, 25°C. | 14.4 kg/cm² | 34 |

EXAMPLE 5

10 parts of a mixture of Colonate L, an adduct of tolylenediisocyanate with trimethylol propane, produced by Nippon Urethane Incorp., and dibutyl phthalate in the ratio of one to one, was added, under strong agitation, to 100 parts of an emulsion, containing 50 weight percent of copolymer of ethylene-vinyl acetate and 5 weight percent of PVA. Next, 2.5 parts of wood powder sieved through 200 mesh, 2.5 parts of wheat flour, 2.5 parts of clay and 15 parts of water were added to it. The prepared adhesive, after a persistent agitation, was tested as in Example 1.

The observed strength of adhesion of plywood was as follows:

| | | |
|---|---|---|
| Adhesive strength in a normal state | 15.4 kg/cm² | wood break (89%), |
| Adhesive strength in tepid water | 14.2 kg/cm² | wood break (61%). |

Both strengths were above 7 kg/cm², which is the lowest permissible limit.

EXAMPLE 6

In order to test the applicability of the adhesive of the invention to woodworking, the adhesive in Example 2 was examined, by preparing plywood from three single boards of lauan, 1mm each in thickness, under the conditions of 22g/ft² of adhesive and a cold press at 10 kg/cm² for 30 min.

The adhesive strength was observed after aging for one day, as shown in Table II.

TABLE II

| Solvent Used | Adhesive strength in normal state(wood break %) | Adhesive strength in tepid water (wood break %) |
|---|---|---|
| dibutyl phthalate | 15.1 kg/cm² (62) | 10.4 kg/cm² (18) |

COMPARATIVE EXAMPLE

At first, 10 weight percent solution of PVA, degree of polymerization of 1700 and a degree of saponification of 98 molar percent, was coated on three single boards, 1mm each in thickness, and dried by evaporation of water. Then, they were coated again with a 10% solution of hexamethylene diisocyanate in toluene and laminated upon each other, immediately, and pressed at 10 kg/cm² of pressure for 10 min. to prepare a plywood. The observed adhesive strength, both at room temperature and in tepid water was too low to obtain a useful plywood product.

EXAMPLE 7

10 parts of an isocyanate (30% solution of Desmodur 44 in ethyl acetate) was added to 100 parts of a commercially available SBR containing a small amount of carboxyl groups (SN-304 manufactured by Sumitomo Naugatuck Co., Ltd.), and 10 parts of wheat flour, 5 parts of wood flour and 10 parts of clay were further added thereto. The resulting mixture was well blended. Three lauan veneers (each having a thickness of 1.0mm) were bonded with use of the so obtained adhesive composition under the conditions set forth below to obtain a plywood having a thickness of 3 mm. The bonding strength of the plywood was determined and the following results were obtained:
 Amount of adhesive coated: 30 g/ 30 cm × 30 cm
 Cold press: 15 minutes under 10 kg/cm$^2$
 Hot press: 60 seconds at 110°C. under 10 kg/cm$^2$
 Bonding strength:
  normal bonding strength of 17.4 kg/cm$^2$ with a wood break ratio of 75%; bonding strength after warm and cold water treatment: 13.6 kg/cm$^2$ with wood break ratio of 45%
 Formalin concentration: 0% (according to desiccator method)

EXAMPLE 8

10 parts of ammonia casein and 30 parts of bentonite were added to 100 parts of a commercially available SBR containing a small amount of carboxyl groups (JSR 0590 manufactured by The Nippon Synthetic Rubber Co., Ltd.), and 10 parts of an isocyanate (50% solution of Desmodur 44 in toluene) was further added thereto to form an adhesive composition.

The resulting adhesive composition was coated on one surface of a lauan plywood having a thickness of 3mm in an amount of 10 g/30cm × 30cm, and a decorative board having a thickness of 0.3mm was lapped on the coated surface of the plywood. The hot press treatment was conducted at 100°C. under a pressure of 2 kg/cm$^2$ for 30 seconds. When test pieces of the resulting product were immersed in warm water maintained at 60°C. for 3 hours, no peeling was observed.

In the case of test pieces of a decorative plywood formed with use of an isocyanate-free adhesive, complete peeling was observed at the above warm water treatment.

EXAMPLE 9

10 parts of an isocyanate (50% solution of Desmodur L in ethyl acetate) was uniformly mixed with 100 parts of a commercially available aqueous latex of a copolymer of butadieneacrylonitrile containing a small amount of carboxyl groups (CD1-78 manufactured by Lacstar Co.). On one surface of a plywood having a thickness of 3mm, the so obtained adhesive was coated in an amount of 20 g/30 cm × 30 cm. An aluminum plate having a thickness of 0.3mm was lapped on the coated surface of the plywood and the cold press treatment was conducted for 3 hours under a pressure of 3 kg/cm$^2$.

The normal state bonding strength was determined according to the knife test method to obtain a wood portion break ratio of 100%. When test pieces were immersed for 3 hours in warm water maintained at 63 ± 3°C., no change was observed.

EXAMPLE 9

50 parts of a commercially available vinyl acetate emulsion (Asahisol 1527) was added to 100 parts of a commercially available aqueous latex of a copolymer of butadieneacrylonitrile containing a small amount of carboxyl groups (CD-80-3 manufactured by Lacstar Co.) and they were well mixed. Then, 80 parts of clay, 20 parts of corn starch and 20 parts of an isocyanate polymer (50% dilution of Desmodur 44 in DOP) were added to the above mixture, and the resulting mixture was well blended to form an adhesive composition.

A plywood having a thickness of 3mm was prepared from three lauan veneers, each having a thickness of 1.0mm with use of the so obtained adhesive composition under the conditions set forth below. The bonding strength of the plywood was determined and the following results were obtained:
 Amount of adhesive coated: 30 g/30 cm × 30 cm
 Cold press: 15 minutes under 10 kg/cm$^2$
 Hot press: 60 seconds at 110°C. under 10 kg/cm$^2$
 Bonding strength:
  Normal state bonding strength: 23.4 kg/cm$^2$ with wood portion break ratio of 100%. Bonding strength after warm and cold water treatment: 17.2 kg/cm$^2$ with wood portion break ratio of 60%.
 Formalin concentration: 0% (according to the desiccator method)

In this adhesive composition, because of the presence of the vinyl acetate emulsion, a good glue condition was obtained, and since the corn starch was made highly pasty at the hot press treatment, excessive permeation of the adhesive into the veneer was effectively prevented and a uniform adhesive layer was formed. (Note: DOP means Dioctylphthalate)

EXAMPLE 10

6 parts of zinc flower, 100 parts of clay, 100 parts of water and 15 parts of medium viscosity carboxymethyl cellulose (CMC) as a thickener were added to 100 parts of a commercially available SBR containing a small amount of carboxyl groups (JSR-0590) and they were well mixed. Then, 25 parts of an isocyanate (40% solution of Desmodur L in ethyl acetate) was added to the mixture and uniformly dispersed therein. A plywood having a thickness of 3mm was prepared from three lauan veneers each having a thickness of 1mm with use of the so formed adhesive under the same conditions as adopted in Example 7 and the bonding strength was determined to obtain the following results.
 Bonding Strength:
  normal state bonding strength: 19.8 kg/cm$^2$ with wood portion break ratio of 100%
  bonding strength after warm and cold water treatment: 12.1 kg/cm$^2$ with wood portion break ratio of 42%
 Formalin Concentration:
  0% (determined according to desiccator method)

In this adhesive composition, though the total solids content was relatively low, by action of CMC as a thickener, the adhesive could be coated uniformly on the veneer without excessive permeation of the adhesive into the veneer.

EXAMPLE 11

5 parts of wood flour and 50 parts of clay were added to 100 parts of a commercially available SBR containing a small amount of carboxyl groups (CO-1-78 manufactured by Lacstar Co.), and 25 parts of an isocyanate (76% solution of Desmodur 44 in toluene) was added to the mixture and dispersed uniformly therein. With use of the so obtained adhesive composition, a plywood having a thickness of 14mm was prepared from 7 lauan veneers, each having a thickness of 2.0mm, by the cold press treatment conducted under the conditions set forth below. The so formed plywood was allowed to stand still for 48 hours at room temperature, and the bonding strength was determined with the following results:

Cold Press Conditions
  Amount of adhesive coated: 100 g/30 cm × 30 cm
  Pressure: 10 kg/cm$^2$
  Time: 60 minutes
Bonding Strength
  Normal state bonding strength: 17.5 kg/cm$^2$ with wood portion break ratio of 100%
  Bonding strength after warm and cold water treatment: 14.4 kg/cm$^2$ with wood portion break ratio of 39%

As is seen from the foregoing results, in accordance with the present invention, a water-resistant plywood can be manufactured even by the cold press method.

EXAMPLE 12

25 grams of polyvinyl alcohol (having a degree of polymerization of 500 and a degree of saponification of 98.7 mole %) was dissolved with heat in 100 g of water. 100 g of a styrene-butadiene latex (having a solids content of 48% and comprising 45% of styrene and 55% of butadiene) and 15 g of wheat flour were added in succession to the above solution, and they were well mixed to obtain a white suspension. Then, 16.5 g of a trimethylol propanetolylene diisocyanate adduct (45% solution of Desmodur L manufactured by Bayer A. G. in ethyl acetate) was added to the suspension and they were well mixed to disperse the adduct in the suspension. The resulting adhesive composition (about 40 minutes had passed from the addition of the isocyanate compound) was coated on lauan veneers (3 veneers each having 1mm thickness; total thickness being 3mm) in an amount of 32 g/ 900 cm$^2$, and the veneers were lapped and allowed to stand still for 15 minutes. Then, the assembly was subjected to temporary compression (cold press) under a pressure of 10 kg/cm$^2$ for 10 minutes, and the hot press was conducted at 120°C. under a pressure of 10 kg/cm$^2$ for 1 minute.

Results of the bonding strength test made according to Japanese Agricultural Standard Notification No. 383 of the Ministry of Agriculture and Forestry, are shown in Table III.

TABLE III

|  | Bonding Strength (kg/cm$^2$) | | |
| --- | --- | --- | --- |
|  | Maximum | Minimum | Average |
| Normal State Bonding Strength | 24.6 | 19.8 | 22.1 |
| Bonding Strength after Warm and Cold Water Treatment | 16.4 | 12.0 | 14.7 |

Note: the value of the bonding strength was determined by conducting the measurement on 15 test pieces.

The initial bonding strength (temporary bonding strength) was quite excellent and no partial peeling was observed.

EXAMPLE 13

500 g of a carboxyl group-containing styrene-butadiene latex (composed of 52% by weight of styrene and 48% by weight of butadiene; carboxyl group content of 40 millimoles per 100 g solid; solid content of 50%) was incorporated in succession with 167g of a separately prepared aqueous solution of polyvinyl alcohol (having a degree of polymerization of 1700 and a degree of saponification of 87 mole %; PVA concentration of 15% by weight), 50 g of clay produced by Shokozan and 27 g of water, and the mixture was well blended. The resulting solution was admixed with 10 grams of triphenylmethane triisocyanate (60% solution of Desmodur R manufactured by Bayer A. G. in ethyl acetate), and they were well mixed under agitation to form an adhesive composition according to this invention.

In the same manner as described in Example 1, a plywood was prepared and the bonding strength was tested to obtain results shown in Table IV.

TABLE IV

|  | Bonding Strength (kg/cm$^2$) | | |
| --- | --- | --- | --- |
|  | Maximum | Minimum | Average |
| Normal state bonding strength | 20.6 | 17.2 | 18.9 |
| Bonding strength after warm and cold water treatment | 15.0 | 12.5 | 13.4 |

Note: the value of the bonding strength was determined by conducting the measurement on 10 test pieces.

EXAMPLE 14

25 g of polyvinyl alcohol (having a degree of polymerization of 400 and a degree of saponification of 87 mole %) was dissolved under heat in 100 g of water, and 35 g of a styrenebutadiene latex (styrene/butadiene weight ratio of 35/65; carboxyl group content of 20 millimoles per 100 g solid; solid content of 50%) and 25 g of gypsum powder (passable through a 25-mesh sieve) were added in succession to the above solution. The mixture was well blended and the resulting solution was incorporated with 22 g of a trimethylol propane-tolylene diisocyanate adduct (45% solution in ethyl acetate). The mixture was well agitated to form an adhesive composition.

In the same manner as described in Example 1, a plywood was prepared with use of the so obtained adhesive composition, and test pieces were immersed in water maintained at 25°C. for 20 days, and then, they were dried in a desiccator maintained at 40°C. for 24 hours. With respect to the so treated test species, the normal state bonding strength and the bonding strength after warm and cold water treatment were determined according to the method employed in Example 12. As a result, it was found that the normal state bonding strength was 16.4 kg/cm$^2$ and the bonding strength after warm and cold water treatment was 10.2 kg/cm$^2$.

EXAMPLE 15

25 g of polyvinyl alcohol (having a degree of polymerization of 700 and a degree of saponification of 99 mole %) was dissolved with heat in 100 g of water, and 60 g of styrenebutadiene latex (styrene/butadiene weight ratio of 65/35; carboxyl group content of 70 millimoles per 100 g solid; solid content of 50%), 40 g of wood flour (cryptomeria flour passable through a 150-mesh sieve) and 15 g of water were added to the above solution and mixed therewith sufficiently to form a dispersion. The resulting dispersion was incorporated with 12.5 g of an isocyanate polymer ("Millinate MR" manufactured by Nippon Polyurethane; 40% solution in toluene), and the mixture was blended and agitated sufficiently to obtain an adhesive composition of this invention.

In the same manner as described in Example 12, a plywood was prepared and the bonding strength was determined to obtain the following results:

Bonding Strength
  Normal state bonding strength (average value of 10 test pieces): bonding strength of 19.3 kg/cm$^2$ with a wood portion break ratio of 94%
  Bonding strength after warm and cold water treatment (average value of 10 test pieces): bonding strength of 13.6 kg/cm$^2$ with a wood portion break ratio of 23%

In the case of test pieces of a plywood formed with use of an adhesive free of the isocyanate compound, all the test pieces were peeled by the warm and cold water treatment.

EXAMPLE 16

Three parts of PVA were dissolved in water on heating, 0.2 part of "Nissan Rapizol B-30" (an anionic surfactant made by Nippon Oils and Fats Co., Ltd., sodium dioctyl sulfosuccinate) was added to the aqueous solution, mixed well, and 15 parts of the dioctyl phthalate solution of 75% isocyanate ("Millionate MR" made by Nippon Polyurethane Co., Ltd.) under stirring for 5 minutes to yield an emulsified solution. Films were prepared from the resulting emulsion in different periods of 0, 3, and 10 hours at 20°C., after preparation of the emulsion. The water resistance of the films (solubility of the film in water) were measured. The results are shown in Table V.

TABLE V

| Standing time of emulsion (hr) | 0 | 3 | 10 |
|---|---|---|---|
| Solubility of Film in water | 1.7% | 2.4% | 2.5% |

Condition of film-preparation: 120°C., 1 min., by hot pressing
Condition of film-dissolving: boiled with water at 100°C. for 2 hours Features of viscosity change of the emulsion and the amount of bubbles formed in the emulsion at different times are shown in Table VI.

TABLE VI

|  | Viscosity (CPS,20°C.) | | Amount of bubbles (10 hrs) (% amount of the emulsion) |
|---|---|---|---|
|  | 20 min. | 4 hrs. |  |
| With "Nissan Rapizol B-30" | 4,500 | 5,300 | 5 |

From the Table it can be seen that the emulsion containing "Nissan Rapizol B-30" exhibited a very small increase in viscosity and a small amount of bubble-formation.

EXAMPLE 17

The procedure of Example 1 was repeated except adding different types of surfactants. Changes in water resistance of the resulting films, viscosity of the emulsions, and bubbleformation from the emulsion with time were measured. As shown in Table VII, anionic surfactants remarkably improve the above properties of the films and the emulsions.

TABLE VII

|  | Surfactant | Solubility of film (%) | | Viscosity (CPS,20°C.) | | Amount of bubbling at 10 hrs.) |
|---|---|---|---|---|---|---|
|  |  | 0hrs. | 10hrs. | 20min. | 4hrs |  |
| Examples of the present invention | Nissan Rapizol B-80[1] | 2.4 | 2.5 | 3,500 | 3,800 | 8 |
|  | Nissan Sintorex[2] | 2.5 | 2.9 | 4,200 | 10,500 | 5 |
|  | Nissan Newrex Powder W[3] | 3.3 | 4.7 | 3,800 | 8,500 | 25 |
| Comparative Examples | Nissan Kation BB[4] | 4.2 | 18.5 | 7,300 | >100,000 | >200 |
|  | Nissan Kation M$_2$-100[5] | 6.4 | 19.1 | 16,400 | 26,000 | >200 |
|  | Nissan Nonion L-4[6] | 4.1 | 17.2 | 4,300 | 29,000 | 180 |

[1] "Nissan Rapizol B-80", Anionic surfactant of Nippon Oils and Fatts Co., Ltd., Sodium dioctyl sulfo succinate.

[2] "Nissan Sintorex", Anionic surfactant of Nissan Oils and Fatts Co. Ltd., Sodium salt of sperm alcohol sulfuric ester.

[3] "Nissan Newrex Powder W", Anionic surfactant of Nippon Oils and Fatts Co. Ltd., Sodium dodecyl benzene sulfate.

[4] "Nissan Kation BB", Cationic surfactant of Nippon Oils and Fatts Co. Ltd., Dodecyl trimethyl ammonium chloride.

[5] "Nissan Kation M$_2$-100", Cationic surfactant of Nippon Oils and Fatts Co. Ltd., Hexadecyl dimethyl benzyl ammonium chloride.

[6] "Nissan Nonion L-4", Nonionic surfactant of Nippon Oils and Fatts Co. Ltd., Polyoxy ethylene monolaurate.

EXAMPLE 18

To 100 parts of an aqueous solution of 10% PVA (degree of polymerization 1700, degree of saponification 98 mole %) were added 15 parts of dioctyl phthalate solution of 70% isocyanate (Nippon Polyurethane "Millionate MR" and 20 parts of "Tsuchiya clay" and further added "Rapizol B-30" at 0.2 weight percent, based on the weight of the total mixture and mixed well.

Adhesive tests were carried out on a piece of plywood 3 mm thick (composed with 3 plates each being 1mm thick) under the conditions set forth below. The conditions and the results obtained are shown in Table VIII.

TABLE VIII

|  | Viscosity CPS (30°C.) | | Adhesion strength[1] | |
|---|---|---|---|---|
|  | $O^{2)}$ | $6hrs^{2)}$ | $O^{2)}$ | $6hrs^{2)}$ |
| With "Nissan Rapizol B-30" | 4,900 | 5,100 | kg/cm² 13.3 | kg/cm² 13.0 |

[1] Adhesion strength in hot or cold water
[2] Time after preparation of the adhesive emulsion Amount of adhesive coating: 30g/30 × 30 cm² Hot pressing: temperature 120°C., time 60 sec.

We claim:

1. An adhesive composition comprising (1) an aqueous solution of polyvinyl alcohol and (2) a hydrophobic solution of an isocyanate compound.
2. An adhesive composition according to claim 1, containing an anionic surface active agent.
3. An adhesive composition according to claim 1, containing an aqueous emulsion of vinyl acetate polymer.
4. An adhesive composition according to claim 1, containing an aqueous latex of butadiene polymer.
5. An adhesive composition according to claim 1, containing both an aqueous emulsion of vinyl acetate polymer and an aqueous latex of butadiene polymer.
6. An adhesive composition according to claim 5 containing an anionic surface active agent.
7. An adhesive composition according to claim 3, wherein the aqueous emulsion of vinyl acetate polymer is selected from the group consisting of an aqueous emulsion of polyvinyl acetate, an aqueous emulsion of a copolymer of vinyl acetate and ethylene and an aqueous emulsion of a copolymer of vinyl acetate and another comonomer of polymerizable with vinyl acetate.
8. An adhesive composition according to claim 4, wherein the aqueous latex of butadiene polymer is selected from the group consisting of an aqueous latex of a copolymer of styrene and butadiene and an aqueous latex of a copolymer of acrylonitrile and butadiene.

* * * * *

REEXAMINATION CERTIFICATE (61st)

United States Patent [19]

Sakurada et al.

[11] B1 3,931,088

[45] Certificate Issued Mar. 15, 1983

[54] ADHESIVE COMPOSITION CONSISTING OF POLYVINYLALCOHOL SOLUTION OR POLYVINYLACETATE LATEX MODIFIED WITH HYDROPHOBIC SOLUTION OF ISOCYANATE COMPOUND

[75] Inventors: Seiichi Sakurada, Shimizu; Yasuaki Miyazaki, Hino; Tatsuaki Hattori; Makoto Shiraishi, both of Toyama; Taisei Inoue, Mitaka, all of Japan

[73] Assignees: Kuraray Co., Ltd., Kurashiki; Asahi Co., Ltd.; Koyo Sangyo Co., Ltd., both of Tokyo, all of Japan

Reexamination Request
No. 90/000,102, Nov. 5, 1981

Reexamination Certificate for:
Patent No.: 3,931,088
Issued: Jan. 6, 1976
Appl. No.: 384,542
Filed: Aug. 1, 1973

[51] Int. Cl.³ .................. C08L 29/04; C08L 23/36
[52] U.S. Cl. .......... 524/197, 156/331.4, 156/331.7; 427/391, 427/388.4, 427/393; 524/475, 524/501, 524/503, 524/557, 524/563, 524/575

[58] Field of Search ... 156/331.4, 331.7; 427/391, 524/388.4, 393; 524/197, 475, 503

[30] Foreign Application Priority Data
Aug. 5, 1972  Japan ..................... 47-78587

[56] References Cited

U.S. PATENT DOCUMENTS

| | | | |
|---|---|---|---|
| 3,428,592 | 2/1969 | Youker | 260/29.2 |
| 3,577,515 | 5/1971 | Vandegaer | 424/32 |
| 3,624,020 | 11/1971 | Klebert et al. | 260/29.6 |
| 3,875,074 | 4/1975 | Vasiliades | 252/316 |

FOREIGN PATENT DOCUMENTS

| | | |
|---|---|---|
| S28416 | 3/1955 | Fed. Rep. of Germany. |
| 2024497 | 3/1972 | Fed. Rep. of Germany. |
| 1333188 | 10/1973 | United Kingdom. |

*Primary Examiner*—Paul R. Michl

[57] ABSTRACT

An adhesive composition is provided comprising (1) a member selected from the group consisting of an aqueous solution of polyvinylalcohol, an aqueous emulsion of vinyl acetate polymer and an aqueous latex of butadiene polymer and (2) a hydrophobic solution of an isocyanate compound or polymer.

B1 3,931,088

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 10, line 3

EXAMPLE [9] *10*

Column 10, line 41

EXAMPLE [10] *11*

Column 11, line 2

EXAMPLE [11] *12*

Column 11, line 31

EXAMPLE [12] *13*

Column 12, line 5

EXAMPLE [13] *14*

Column 12, line 37

EXAMPLE [14] *15*

Column 12, line 63

EXAMPLE [15] *16*

Column 13, line 27

EXAMPLE [16] *17*

Column 14, line 29

EXAMPLE [17] *18*

Column 15, line 2

EXAMPLE [18] *19*

AS A RESULT OF REEXAMINATION, IT HAS BEEN DETERMINED THAT:

Claims 1, 2, and 6–8, having been finally determined to be unpatentable, are cancelled.

Claims 3, 4 and 5 are determined to be patentable as amended.

3. [An] *A water-resistant* adhesive composition according to claim [1] *9* [containing] *in which the first mixture is* an aqueous solution of polyvinyl alcohol and an aqueous emulsion of vinyl acetate polymer.

4. [An] *A water-resistant* adhesive composition according to claim [1] *9* [containing] *in which the first mixture is* an aqueous solution of polyvinyl alcohol, and an aqueous latex of butadiene polymer.

5. [An] *A water-resistant* adhesive composition according to claim [1] *9* [containing both] *in which the first mixture is* an aqueous solution of polyvinyl alcohol, an aqueous emulsion of vinyl acetate polymer and an aqueous latex of butadiene polymer.

New claims 9–41 added and determined to be patentable.

9. *A water-resistant adhesive composition comprising (1) a first mixture of an aqueous solution of polyvinyl alcohol in which the polyvinyl alcohol is present in an amount ranging from 5 to 20 weight percent of said aqueous solution, and an aqueous emulsion of a vinyl acetate polymer and/or an aqueous latex of a butadiene polymer, and (2) a second mixture of an isocyanate compound and a solvent selected from the group consisting of aliphatic hydrocarbons, aromatic hydrocarbons, halogenated hydrocarbons, ketones, ethers, esters and mixtures thereof, said solvent being less than 5 weight percent soluble in water and water being less than 5 weight percent soluble in said solvent at a temperature between 20° and 30° C., and said solvent being present in an amount ranging from 10 to 400 weight percent of said isocyanate compound.*

10. *A water resistant adhesive composition according to claim 4 in which the butadiene polymer is present in an amount of 0.7 to 10 times the weight of polyvinyl alcohol.*

11. *A water-resistant adhesive composition according to claims 3 or 5 in which the vinyl acetate polymer is selected from the group consisting of polyvinyl acetate and a copolymer of vinyl acetate and a comonomer polymerizable therewith.*

12. *A water-resistant adhesive composition according to claim 11 in which the vinyl acetate polymer is polyvinyl acetate.*

13. *A water-resistant adhesive composition according to claim 11 in which the vinyl acetate polymer is a copolymer of vinyl acetate and ethylene.*

14. *A water-resistant adhesive composition according to claims 4 or 5 in which the butadiene polymer is a copolymer of butadiene.*

15. *A water-resistant adhesive composition according to claim 14 in which the copolymer is selected from the group consisting of a copolymer of butadiene and styrene and a copolymer of butadiene and acrylonitrile.*

16. *A water-resistant adhesive composition according to claim 9 in which the ratio of isocyanate compound to polyvinyl alcohol ranges from 10 to 150 weight percent.*

17. *A water-resistant adhesive composition according to claim 9 containing from 1 to 10 weight percent, based on the total weight of polyvinyl alcohol and vinyl acetate polymer and/or butadiene polymer, of an anionic surface active agent.*

18. *A method for promoting adhesion of wood products, metallic foil, paper and fibers, which comprises applying to the area to be adhered a water resistant adhesive composition comprising (1) a first mixture of an aqueous solution of polyvinyl alcohol in which the polyvinyl alcohol is present in an amount ranging from 5 to 20 weight percent of said aqueous solution, and an aqueous emulsion of a vinyl acetate polymer and/or aqueous latex of a butadiene polymer, and (2) a second mixture of an isocyanate compound and a solvent selected from the group consisting of aliphatic hydrocarbons, aromatic hydrocarbons, halogenated hydrocarbons, ketones, ethers, esters and mixtures thereof, said solvent being less than 5 weight percent soluble in water and water being less than 5 weight percent soluble in said solvent at a temperature between 20° and 30° C., and said solvent being present in an amount ranging from 10 to 400 weight percent of said isocyanate compound.*

19. *A method for bonding wood boards in the manufacture of plywood which comprises applying to the sur-* faces to be bonded an adhesive composition comprising (1) an aqueous solution of polyvinyl alcohol and (2) a hydrophobic solution of an isocyanate compound.

20. A method according to claim 19 in which the adhesive composition comprises (1) an aqueous solution having from 5 to 20 weight percent of polyvinyl alcohol and (2) a hydrophobic solution in which the solvent is present in an amount ranging from 10 to 400 weight percent of the isocyanate compound.

21. A method according to claim 19 in which the adhesive composition comprises (1) an aqueous solution of polyvinyl alcohol and an aqueous emulsion of vinyl acetate polymer and/or an aqueous latex of butadiene polymer in which the polyvinyl alcohol is present in an amount ranging from 5 to 20 weight percent of said aqueous solution, aqueous emulsion or aqueous latex and (2) a hydrophobic solution in which the solvent is present in an amount ranging from 10 to 400 weight percent of the isocyanate compound.

22. A method according to claim 21 in which said composition contains an aqueous emulsion of vinyl acetate polymer.

23. A method according to claim 21 in which said composition contains an aqueous latex of butadiene polymer.

24. A method according to claim 21 in which said composition contains both an aqueous emulsion of vinyl acetate polymer and an aqueous latex of butadiene polymer.

25. A method according to claims 18 or 21 in which the adhesive composition also contains from 1 to 10 percent by weight of ingredient (1) of an anionic surface-active agent.

26. A method for bonding wood boards in the manufacture of plywood which comprises applying to the surfaces to be bonded a water resistant adhesive composition comprising (1) a first mixture of an aqueous solution of polyvinyl alcohol in which the polyvinyl alcohol is present in an amount ranging from 5 to 20 weight percent of said aqueous solution, and a aqueous emulsion of a vinyl acetate polymer and/or an aqueous latex of a butadiene polymer and (2) a second mixture of an isocyanate compound and a solvent selected from the group consisting of aliphatic hydrocarbons, aromatic hydrocarbons, halogenated hydrocarbons, ketones, ethers, esters and mixtures thereof, said solvent being less than 5 weight percent soluble in said solvent at a temperature between 20° and 30° C., and said solvent being present in an amount ranging from 10 to 400 weight percent of said isocyanate compound.

27. A method according to claims 18 or 26 in which, in the adhesive composition, the first mixture is an aqueous solution of polyvinyl alcohol and an aqueous emulsion of vinyl acetate polymer.

28. A method according to claims 18 or 26 in which, in the adhesive composition, the first mixture is an aqueous solution of polyvinyl alcohol and an aqueous latex of butadiene polymer.

29. A method according to claim 28 in which the butadiene polymer is present in an amount of 0.7 to 10 times the weight of polyvinyl alcohol.

30. A method according to claims 18 or 26 in which, the first mixture is an aqueous solution of polyvinyl alcohol, an aqueous emulsion of vinyl acetate polymer and an aqueous latex of butadiene polymer.

31. A method according to claim 27 in which the vinyl acetate polymer is selected from the group consisting of polyvinyl acetate and a copolymer of vinyl acetate and comonomer polymerizable therewith.

32. A method according to claim 31 in which the vinyl acetate polymer is polyvinyl acetate.

33. A method according to claim 31 in which the vinyl acetate polymer is a copolymer of vinyl acetate and ethylene.

34. A method according to claim 28 in which the butadiene polymer is a copolymer of butadiene.

35. A method according to claim 34 in which the copolymer is selected from the group consisting of a copolymer of butadiene and styrene and a copolymer of butadiene and acrylonitrile.

36. A method according to claims 18 or 26 in which, in the adhesive composition, the ratio of isocyanate compound to polyvinyl alcohol ranges from 10 to 150 weight percent.

37. A method according to claims 18 or 26 in which the adhesive composition contains from 1 to 10 weight percent, based on the total weight of polyvinyl alcohol and vinyl acetate polymer and/or butadiene polymer, of an anionic surface active agent.

38. A water-resistant composition according to claim 9 in which the solvent in the second mixture has a boiling point higher than 200° C.

39. A method according to claims 18 or 26 in which, in the adhesive composition, the solvent in the second mixture has a boiling point of higher than 200° C.

40. A method according to claim 30 in which the vinyl acetate polymer is selected from the group consisting of polyvinyl acetate and a copolymer of vinyl acetate and a comonomer polymerizable therewith.

41. A method according to claim 30 in which the butadiene polymer is a copolymer of butadiene.

* * * * *